(12) United States Patent
Irifune et al.

(10) Patent No.: US 11,834,779 B2
(45) Date of Patent: Dec. 5, 2023

(54) FUNCTIONAL-AGENT-CONTAINING FIBER AND METHOD FOR MANUFACTURING SAME

(71) Applicants: SHIN-ETSU CHEMICAL CO., LTD., Tokyo (JP); KURASHIKI BOSEKI KABUSHIKI KAISHA, Kurashiki (JP)

(72) Inventors: Shinji Irifune, Gunma (JP); Tomoya Kanai, Gunma (JP); Masaki Tanaka, Tokyo (JP); Minoru Sugiyama, Osaka (JP); Hidenobu Morishima, Osaka (JP); Kazuhiro Sato, Osaka (JP)

(73) Assignees: SHIN-ETSU CHEMICAL CO., LTD., Tokyo (JP); KURASHIKI BOSEKI KABUSHIKI KAISHA, Okayama (JP)

( * ) Notice: Subject to any disclaimer, the term of this patent is extended or adjusted under 35 U.S.C. 154(b) by 453 days.

(21) Appl. No.: 16/630,316

(22) PCT Filed: Mar. 26, 2018

(86) PCT No.: PCT/JP2018/012169
§ 371 (c)(1),
(2) Date: Jan. 10, 2020

(87) PCT Pub. No.: WO2019/012744
PCT Pub. Date: Jan. 17, 2019

(65) Prior Publication Data
US 2020/0165772 A1    May 28, 2020

(30) Foreign Application Priority Data

Jul. 14, 2017   (JP) ................................ 2017-138255

(51) Int. Cl.
| | | |
|---|---|---|
| *D06M 15/643* | (2006.01) | |
| *D06M 13/152* | (2006.01) | |
| *D06M 13/184* | (2006.01) | |
| *D06M 14/18* | (2006.01) | |
| *D06M 15/03* | (2006.01) | |
| *D06M 15/15* | (2006.01) | |
| *D06M 101/04* | (2006.01) | |
| *D06M 101/12* | (2006.01) | |

(52) U.S. Cl.
CPC ........ *D06M 15/643* (2013.01); *D06M 13/152* (2013.01); *D06M 13/184* (2013.01); *D06M 14/18* (2013.01); *D06M 15/03* (2013.01); *D06M 15/15* (2013.01); *D06M 2101/04* (2013.01); *D06M 2101/12* (2013.01)

(58) Field of Classification Search
CPC ...... D06M 10/00; D06M 14/00; D06M 15/00; Y10T 442/2328; Y10T 442/2393; Y10T 442/2762; Y10T 428/29
See application file for complete search history.

(56) References Cited

U.S. PATENT DOCUMENTS

| | | | | |
|---|---|---|---|---|
| 4,698,406 | A * | 10/1987 | Lo ............................ | C08L 83/08 528/901 |
| 5,869,172 | A * | 2/1999 | Caldwell ................ | D21H 17/59 977/788 |
| 6,616,980 | B2 * | 9/2003 | Tully ................... | C09D 183/12 427/387 |
| 2002/0130295 | A1 * | 9/2002 | Dominguez ........... | D06M 11/76 252/8.91 |

(Continued)

FOREIGN PATENT DOCUMENTS

| | | |
|---|---|---|
| EP | 0 267 004 | 5/1988 |
| JP | 52-132171 | 11/1977 |

(Continued)

OTHER PUBLICATIONS

Abdel-Rahman, "Finishing of cellulosic fabric with chitosan/polyethylene glycol-siloxane to improve their performance and antibacterial properties"; Life Science Journal, Jan. 2013 (Year: 2013).*

Goddard, "Polymer surface modification for the attachment of bioactive compounds"; ScienceDirect; Progress in Polymer Science 32 (2007) 698-725 (Year: 2007).*

(Continued)

*Primary Examiner* — Jennifer A Steele
(74) *Attorney, Agent, or Firm* — Hamre, Schumann, Mueller & Larson, P.C.

(57) ABSTRACT

Functional agent-containing fibers according to an embodiment of the present invention, wherein a functional agent is supported by silicone fixed to the fibers. The silicone includes an acrylic-modified organopolysiloxane having two or more acrylic groups per molecule. A rate of decrease in the functional agent after the functional agent-containing fibers are washed 10 times is less than 40%. In the present invention, the functional agent-containing fibers may be produced, e.g., by irradiating fibers impregnated with a fiber treatment agent A containing silicone with an electron beam so that the silicone is fixed to the fibers, and impregnating the fibers to which the silicone has been fixed with a fiber treatment agent B containing a functional agent. The functional agent-containing fibers may be produced, e.g., by impregnating fibers with a fiber treatment agent C containing silicone and a functional agent and irradiating the fibers impregnated with the fiber treatment agent C with an electron beam so that the silicone is fixed to the fibers and the functional agent is supported by the silicone fixed to the fibers. Thus, functional agent-containing fibers having improved washing resistance and a method for producing the fibers are provided.

15 Claims, No Drawings

(56) References Cited

U.S. PATENT DOCUMENTS

| | | | | |
|---|---|---|---|---|
| 2003/0060106 A1* | 3/2003 | Haggquist | ............... | D06B 5/08 |
| | | | | 442/131 |
| 2003/0064232 A1* | 4/2003 | Allen | ..................... | C08L 83/06 |
| | | | | 428/447 |
| 2009/0176424 A1* | 7/2009 | Owens | .................. | B82Y 30/00 |
| | | | | 428/447 |

FOREIGN PATENT DOCUMENTS

| | | |
|---|---|---|
| JP | 63-128074 | 5/1988 |
| JP | 2001-181964 | 7/2001 |
| JP | 2007-224429 | 9/2007 |
| JP | 2008-050743 | 3/2008 |
| WO | 2006/120851 | 11/2006 |

OTHER PUBLICATIONS

Cabrales, "Microwave plasma induced grafting of oleic acid on cotton fabric surfaces"; Elsevier, Applied Surface Science, Jan. 13, 2012 (Year: 2012).*

Database WPI, Thomson Scientific, AN 2008-G94163, XP002802225 & JP 2008-050743, Mar. 6, 2008, 2 pages.

Extended European Search Report issued in corresponding European Patent Application No. 18831865.3, dated Mar. 18, 2021, 33 pages.

* cited by examiner

FUNCTIONAL-AGENT-CONTAINING FIBER AND METHOD FOR MANUFACTURING SAME

TECHNICAL FIELD

The present invention relates to functional agent-containing fibers with a functional agent supported by fibers via, silicone fixed to the fibers and a method for producing the fibers.

BACKGROUND ART

In recent years, a wide variety of functional agents have been adhered to fibers to impart functionalities such as moisture retention properties and deodorant properties to the fibers. For example, Patent Document 1 proposes that hydroxyproline, known as an amino acid having moisturizing effects, or N-acylated derivatives of hydroxyproline, or salts thereof, be fixed to a fiber product by a silicone hinder. Patent Document 2 proposes that a functional component that includes at least one of a mucopolysaccharide and a silk-derived protein be fixed to a fiber surface by a binder containing a silicone emulsion as a binder base to impart a cold touch feeling. Patent Document 3 proposes that a fiber surface be provided with a complex oxide containing titanium and silicon together with a silicone resin to impart functionalities such as deodorant properties.

PRIOR ART DOCUMENTS

Patent Documents

Patent Document 1: WO 2006/120851 A
Patent Document 2: JP 2007-224429 A
Patent Document 3: JP 2001-181964 A

DISCLOSURE OF INVENTION

Problem to be Solved by the Invention

Patent Documents 1 to 3 mention that functional fibers contain dimethylpolysiloxane or a hydroxyl group-containing silicone resin used as a binder. Unfortunately, such functional fibers are less resistant to washing. Thus, the functional agents tend to be removed from the fibers by washing.

To solve the above problem, the present invention provides functional agent-containing fibers having improved washing resistance and a method for producing the fibers.

Means for Solving Problem

In one embodiment, the present invention relates to functional agent-containing fibers that include a functional agent. The functional agent is supported by silicone fixed to the fibers. The silicone includes an acrylic-modified organopolysiloxane having two or more acrylic groups per molecule. A rate of decrease in the functional agent after the functional agent-containing fibers are washed 10 times is less than 40%.

In one embodiment, the present invention relates to a method for producing functional agent-containing fibers that include a functional agent. The method includes the following: irradiating fibers impregnated with a fiber treatment agent (A) containing silicone with an electron beam so that the silicone is fixed to the fibers; and impregnating the fibers to which the silicone has been fixed with a fiber treatment agent (B) containing a functional agent. The silicone includes an acrylic-modified organopolysiloxane having two or more acrylic groups per molecule. The functional agent is supported by the silicone fixed to the fibers.

In one embodiment, the present invention relates to a method for producing functional agent-containing fibers that include a functional agent. The method includes the following: impregnating fibers with a fiber treatment agent (C) containing silicone and a functional agent; and irradiating the fibers impregnated with the fiber treatment agent (C) with an electron beam so that the silicone is fixed to the fibers. The silicone includes an acrylic-modified organopolysiloxane having two or more acrylic groups per molecule. The functional agent is supported by the silicone fixed to the fibers.

In one embodiment of the present invention, the functional agent may be at least one selected from the group consisting of a fatty acid, a polyphenol, a protein, and a polysaccharide.

In one embodiment of the present invention, the fibers preferably include one or more natural fibers selected from the group consisting of cotton, silk, hemp, wool, angora, and mohair. In one embodiment of the present invention, the fibers may be in at least one form selected from the group consisting of staple, filament, tow, yarn, woven fabric, knitted fabric, wadding, and nonwoven fabric.

Effects of the Invention

The present invention can provide functional agent-containing fibers having improved washing resistance. The methods of the present invention for producing the fibers can produce the functional agent-containing fibers having improved washing resistance.

DESCRIPTION OF THE INVENTION

The present inventors conducted many studies to improve the washing resistance of functional agent-containing fibers that include a functional agent. Consequently, the present inventors found that, using silicone that includes an acrylic-modified organopolysiloxane having two or more acrylic groups per molecule, when the silicone was firmly fixed to fibers by electron beam irradiation and the functional agent was supported by the silicone, the removal of the functional agent from the functional agent-containing fibers was suppressed even after washing and the washing resistance of the functional agent-containing fibers was improved. Based on these findings, the present inventors have reached the present invention. In the functional agent-containing fibers, the silicone is fixed to the fibers and therefore is not easily removed from the fibers by washing. The reason for this is as follows. Since the acrylic-modified organopolysiloxane (A) having two or more acrylic groups per molecule is used as the silicone, radicals are generated by electron beam irradiation and a crosslinking reaction of the silicone proceeds while the silicone is entangled with the fibers by, e.g., graft polymerization. Thus, the silicone is fixed to the fibers. Moreover, the functional agent is structurally entangled with the silicone fixed to the fibers, and thus is supported by the silicone. Alternatively, the functional agent interacts hydrophobically with the silicone fixed to the fibers, so that the functional agent is supported by the silicone.

The acrylic-modified organopolysiloxane (A) having two or more acrylic groups per molecule is not particularly limited and may be, e.g., an acrylic-modified organopolysiloxane that has two or more acrylic groups per molecule and contains a unit represented by the following general formula (1) in the molecule.

[Chemical Formula 1]

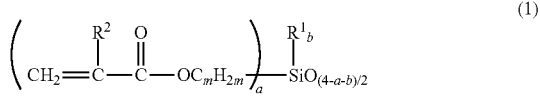

In the general formula (1), $R^1$ represents the same or different substituted or unsubstituted monovalent hydrocarbon group having 1 to 18 carbon atoms, $R^2$ represents a hydrogen atom, m is an integer of 1 to 8, and a and b are positive numbers and satisfy a+b≤3. The substituted or unsubstituted monovalent hydrocarbon group having 1 to 18 carbon atoms is not particularly limited. Examples of the substituted or unsubstituted monovalent hydrocarbon group having 1 to 18 carbon atoms include the following: alkyl groups such as methyl, ethyl, propyl, and butyl groups; alkenyl groups such as vinyl and allyl groups; aryl groups such as phenyl and tolyl groups; and substituted forms of these groups in which some or all hydrogen atoms bonded to carbon atoms are substituted by halogen atoms or cyano groups, including, e.g., chloromethyl group, trifluoropropyl group, and cyanoethyl group. In the general formula (1), $R^1$ is more preferably a methyl group.

The viscosity of the acrylic-modified organopolysiloxane (A) is preferably 50 to 5000 mPa·s at 25° C. If the viscosity is less than 50 mPa·s, the acrylic-modified organopolysiloxane (A) is not likely to adhere to the fibers. If the viscosity is more than 5000 mPa·s, the composition will have a higher viscosity, and thus the treatment of the fibers tends to be difficult. The viscosity of the acrylic-modified organopolysiloxane (A) is more preferably 100 to 1000 mPa·s at 25° C. The acrylic-modified organopolysiloxane (A) may be either a single acrylic-modified organopolysiloxane or a mixture of a plurality of acrylic-modified organopolysiloxanes that differ in the degree of polymerization and the amount of functional groups.

In one embodiment of the present invention, the silicone is not particularly limited. However, from the viewpoint of improving the softness of the fibers, the silicone may further include an amino-modified organopolysiloxane (B) having one or more amino groups per molecule, as represented by the following general formula (2).

[Chemical Formula 2]

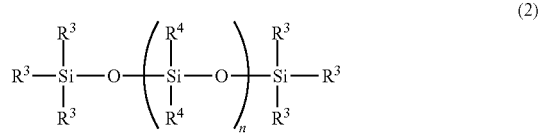

In the general formula (2), a plurality of $R^3$s represent the same or different substituted or unsubstituted monovalent hydrocarbon group having 1 to 18 carbon atoms, a hydroxyl group, an alkoxy group, or an amino group. A plurality of $R^4$s represent the same or different substituted or unsubstituted monovalent hydrocarbon group having 1 to 18 carbon atoms or an amino group. At least one of the $R^3$s and $R^4$s is an amino group. Moreover, n is a positive number. Examples of the substituted or unsubstituted monovalent hydrocarbon group having 1 to 18 carbon atoms may be the same as those described above. In the general formula (2), the amino group represented by $R^3$ or $R^4$ is not particularly limited and may be, e.g., an amino group represented by the following general formula (3).

[Chemical Formula 3]

In the general formula (3), $R^5$ represents a substituted or unsubstituted divalent hydrocarbon group having 1 to 8 carbon atoms, $R^6$, $R^7$, and $R^8$ each represent a hydrogen atom, a substituted or unsubstituted monovalent hydrocarbon group having 1 to 4 carbon atoms, or —$CH_2CH(OH)CH_2OH$, and c is an integer of 0 to 4. Examples of the divalent hydrocarbon group having 1 to 8 carbon atoms include the following: alkylene groups such as ethylene, trimethylene, tetramethylene, hexamethylene, and isobutylene groups; methylene-phenylene group; and methylene-phenylene-methylene group. Among them, the trimethylene group is preferred. Examples of the substituted or unsubstituted monovalent hydrocarbon group having 1 to 4 carbon atoms include the following: alkyl groups such as methyl, ethyl, propyl, and butyl groups; alkenyl groups such as vinyl and allyl groups; and substituted forms of these groups in which some of the hydrogen atoms bonded to carbon atoms are substituted by halogen atoms. Among them, the methyl group is particularly preferred in terms of water repellency, smoothness and softness.

The viscosity of the amino-modified organopolysiloxane (B) is preferably 50 to 5000 mPa·s at 25° C. If the viscosity is less than 50 mPa·s, the amino-modified organopolysiloxane (B) is not likely to adhere to the fibers. If the viscosity is more than 5000 mPa·s, the composition will have a higher viscosity, and thus the treatment of the fibers tends to be difficult. The viscosity of the amino-modified organopolysiloxane (B) is more preferably 100 to 1000 mPa·s at 25° C.

In one embodiment of the present invention, from the viewpoint of improving the fixing properties of the silicone to the fibers and a texture of the fibers, when the total mass of the acrylic-modified organopolysiloxane (A) and the amino-modified organopolysiloxane (B) is 100% by mass, the blending amount of the acrylic-modified organopolysiloxane (A) may be, but is not limited to, 10 to 95% by mass, and more preferably 30 to 90% by mass and the blending amount of the amino-modified organopolysiloxane (B) may be, but is not limited to, 5 to 90% by mass, and more preferably 10 to 70% by mass.

Any functional agent that can impart a functionality to fibers may be used. The functional agent may include a functional group such as an alkyl group and a phenyl group. The functional agent that includes such a functional group easily interacts hydrophobically with the silicone fixed to the fibers. The functional agent may be a large molecule having a molecular weight of 260 or more. The functional agent having such a large molecular weight is easily entangled with the silicone fixed to the fibers. The functional agent may include a branch or a side chain. The functional agent that includes a branch or a side chain is easily entangled with the silicone fixed to the fibers. Examples of the functional agent include a substance having moisturizing effects (also referred to as a moisturizing agent in the following), a substance having antioxidative effects (also referred to as an antioxidant in the following), a substance having ultraviolet absorption effects (also referred to as a UV absorbent in the following), and a substance having antimicrobial and deodorant effects (also referred to as an antimicrobial and deodorant agent in the following). The moisturizing agent is not particularly limited and may be, e.g., a fatty acid, a polysaccharide, or a protein. The antioxidant is not particularly limited and may be, e.g., a polyphenol or a protein. The UV absorbent is not particularly limited and may be, e.g., a polyphenol or a fatty acid. The antimicrobial and deodorant agent may be, e.g., a polyphenol or a protein. The fatty acid is not particularly limited and may be, e.g., a stearic acid or an oleic acid. The polysaccharide is not particularly limited and may be, e.g., fucoidan. The protein may be, e.g., sericin. The sericin has excellent moisture retention properties, the effects of suppressing atopic dermatitis, and good supportability by the silicone. The polyphenol may be, e.g., a catechin, tannin, or isosaponarin.

The content of the functional agent in the functional agent-containing fibers is not particularly limited, and may be determined as appropriate in accordance with e.g., the kind of the functional agent or the intended use of the functional agent-containing fibers. In one embodiment of the present invention, the content of the functional agent in the fibers may be measured as described later.

A rate of decrease in the functional agent after the functional agent-containing fibers are washed 10 times is less than 40%, preferably 30% or less, more preferably 25% or less, further preferably 15% or less, and especially preferably 5% or less. Even after washing, the removal of the functional agent is suppressed, and the functional agent has its effects. That is, the functional agent-containing fibers can still be used as functional fibers after washing.

A rate of decrease in the silicone after the functional agent-containing fibers are washed 10 times is less than 50%, preferably 35% or less, more preferably 15% or less, further preferably 10% or less, and especially preferably 5% or less. With this configuration, the functional agent-containing fibers can have a good texture even after washing. In the functional agent-containing fibers of the present invention, as will be described later, the fibers are coated or impregnated with a fiber treatment agent containing the acrylic-modified organopolysiloxane (A) or a fiber treatment agent containing the acrylic-modified organopolysiloxane (A) and the amino-modified organopolysiloxane (B), and then the treated fibers are irradiated with an electron beam, so that the silicone can be fixed to the fibers. In one embodiment of the present invention, the content of the silicone in the fibers may be measured as described later.

A rate of decrease in the amount of Si after the functional agent-containing fibers are washed 10 times is less than 50%, preferably 35% or less, more preferably 15% or less, further preferably 10% or less, and especially preferably 5% or less. With this configuration, the functional agent-containing fibers can have a good texture even after washing. In the functional agent-containing fibers of the present invention, as will be described later, the fibers are coated or impregnated with the fiber treatment agent containing the acrylic-modified organopolysiloxane (A) or the fiber treatment agent containing the acrylic-modified organopolysiloxane (A) and the amino-modified organopolysiloxane (B), and then the treated fibers are irradiated with an electron beam, so that the silicone can be fixed to the fibers. In one embodiment of the present invention, the amount of Si in the fibers may be measured as described later.

The fibers are not particularly limited and may be either natural fibers or synthetic fibers. The natural fibers are not particularly limited and may be, e.g., cotton, silk, hemp, wool, angora, or mohair. The synthetic fibers are not particularly limited and may be, e.g., polyester fibers, nylon fibers, acrylic fibers, or spandex. From the viewpoint of improving the fixing properties of the silicone to the fibers, the fibers preferably include one or more natural fibers selected from the group consisting of cotton, silk, hemp, wool, angora, and mohair.

The form of the fibers is not particularly limited. The fibers may be in any form such as staple, filament, tow, yarn, woven fabric, knitted fabric, wadding, nonwoven fabric, or paper.

In one embodiment of the present invention, the functional agent-containing fibers may be produced, e.g., by irradiating the fibers impregnated with a fiber treatment agent (A) containing the silicone with an electron beam so that the silicone is fixed to the fibers, and impregnating the fibers to which the silicone has been fixed with a fiber treatment agent (B) containing the functional agent so that the functional agent is supported by the silicone fixed to the fibers. As described above, the silicone includes the acrylic-modified organopolysiloxane (A) or a mixture of the acrylic-modified organopolysiloxane (A) and the amino-modified organopolysiloxane (B).

The silicone, i.e., the acrylic-modified organopolysiloxane (A) or the mixture of the acrylic-modified organopolysiloxane (A) and the amino-modified organopolysiloxane (B) (also referred to simply as a "silicone component" in the following) may be directly used as the fiber treatment agent (A).

In one embodiment of the present invention, from the viewpoint of handleability, the silicone (silicone component) may be diluted with an organic solvent to form a solution, and this solution may be used as the fiber treatment agent (A). Any organic solvent that can dissolve the silicone may be used. Examples of the organic solvent include the following: aromatic hydrocarbon solvents such as toluene and xylene; aliphatic hydrocarbon solvents such as hexane, octane, and isoparaffin; ether solvents such as diisopropyl ether and 1,4-dioxane; and a mixed solvent thereof. The aromatic hydrocarbon solvents such as toluene and xylene and the aliphatic hydrocarbon solvents such as hexane, octane, and isoparaffin are particularly preferred. The dilute concentration of the silicone component is not particularly limited. For example, the concentration of the acrylic-modified organopolysiloxane (A) or the total concentration of the acrylic-modified organopolysiloxane (A) and the amino-modified organopolysiloxane (B) may be 1 to 60% by mass, and more preferably 1 to 20% by mass.

In one embodiment of the present invention, the silicone component may be dispersed in water as a dispersion medium to form an emulsion, and this emulsion may be used as the fiber treatment agent (A). The emulsification may use, e.g., a nonionic surfactant, an anionic surfactant, a cationic surfactant, or an amphoteric surfactant. The nonionic surfactant is not particularly limited and may be, e.g., polyoxyethylene alkyl ether, polyoxyethylene alkyl phenyl ether, sorbitan alkylate, or polyoxyethylene sorbitan alkylate. The anionic surfactant is not particularly limited and may be, e.g., alkylbenzene sulfonate or alkyl phosphate. The cationic surfactant is not particularly limited and may be, e.g., quaternary ammonium salts or alkylamine salts. The amphoteric surfactant is not particularly limited and may be, e.g., alkyl betaine or alkyl imidazoline. These surfactants may be used individually or in combinations of two or more. There is no particular limitation to the surfactants. However, from the viewpoint of ease of emulsification of the silicone, the HLB (hydrophilic-lipophilic balance) of the surfactants is preferably 11 to 18, and more preferably 13 to 16.

The amount of the surfactant used is preferably 5 to 50 parts by mass, and more preferably 10 to 30 parts by mass with respect to 100 parts by mass of the silicone component, i.e., the acrylic-modified organopolysiloxane (A) or the mixture of the acrylic-modified organopolysiloxane (A) and the amino-modified organopolysiloxane (B). Any suitable amount of water may be used for emulsification. However, water may be used in an amount such that the concentration of the acrylic-modified organopolysiloxane (A) or the total concentration of the acrylic-modified organopolysiloxane (A) and the amino-modified organopolysiloxane (B) is generally 1 to 60% by mass, and preferably 1 to 20% by mass. The emulsification may be performed by mixing the acrylic-modified organopolysiloxane (A) or the acrylic-modified organopolysiloxane (A) and the amino-modified organopolysiloxane (B) with the surfactant, and emulsifying the mixture with an emulsifier such as a homomixer, a homogenizer, a colloid mill, or a line mixer.

In one embodiment of the present invention, when both the acrylic-modified organopolysiloxane (A) and the amino-modified organopolysiloxane (B) are used as the silicone component, these components may be mixed in advance to form a solution or an emulsion. Alternatively, these components may be separately formed in advance into solutions or emulsions, and then the respective solutions or emulsions may be mixed together.

Any known method such as roll coating, gravure coating, wire doctor coating, air knife coating, or dipping may be used to impregnate the fibers with the fiber treatment agent (A). There is no particular limitation to the method. The impregnation amount (also referred to as the coating amount) is preferably 0.01 to 20.0 $g/m^2$, and more preferably 0.01 to 5 $g/m^2$. When the impregnation amount is within the above range, the fixing properties of the silicone to the fibers can be improved.

In one embodiment of the present invention, when the fiber treatment agent (A) is a solution obtained by diluting the silicone with an organic solvent, or an emulsion obtained by dispersing the silicone in water, the fibers impregnated with the fiber treatment agent (A) may be dried to vaporize the organic solvent or the water (the dispersion medium of the emulsion). The drying may be performed, e.g., by blowing hot air on the fibers or using a heating furnace. The drying temperature and the drying time may be determined as desired so as not to affect the fibers. For example, the drying temperature may be 100 to 150° C. and the drying time may be 10 sec to 5 min.

The fibers impregnated with the fiber treatment agent (A) are irradiated with an electron beam so that the silicone is fixed to the fibers. The electron beam irradiation apparatus is not particularly limited and may be, e.g., a curtain system, a scanning system, or a double scanning system. The acceleration voltage of the electron beam by the electron beam irradiation is not particularly limited and may be, e.g., 100 to 1000 kV. If the acceleration voltage is less than 100 kV, there may be a lack of energy transmission. If the acceleration voltage is more than 1000 kV, economic efficiency may be reduced. Moreover, the irradiation amount of the electron beam is not particularly limited and may be, e.g., 5 to 100 kGy. If the irradiation amount is less than 5 kGy, curing failure may occur. If the irradiation amount is 100 kGy or more, the fibers may be degraded. When the fiber treatment agent (A) is a solution obtained by diluting the silicone with an organic solvent, the fibers may be immersed (washed) in the organic solvent that has been used for dilution of the silicone, after the electron beam irradiation, thereby removing unreacted silicone. On the other hand, when the fiber treatment agent is an emulsion obtained by dispersing the silicone in water, the fibers may be washed with water after the electron beam irradiation, thereby removing unreacted silicone.

In one embodiment of the present invention, when the functional agent is a liquid, the functional agent may be used, e.g., directly as the fiber treatment agent (B).

In one embodiment of the present invention, the functional agent is not particularly limited. From the view point of good handleability, the functional agent may be dispersed in water to form an emulsion, and this emulsion may be used as the fiber treatment agent (B). In this case, a surfactant may be used. The surfactant may be the same as one of the above surfactants used to emulsify the silicone component. Alternatively, in one embodiment of the present invention, the functional agent may be dissolved in water to form an aqueous solution, and this aqueous solution may be used as the fiber treatment agent (B). The concentration of the functional agent in the fiber treatment agent (B) may be selected as appropriate in accordance with the kind of the functional agent, or the like.

A method for impregnating the fibers to which the silicone is fixed with the fiber treatment agent (B) may be the same as one of the above methods to impregnate the fibers with fiber treatment agent (A). There is no particular limitation to the method. The impregnation amount (also referred to as the coating amount) is preferably 0.01 to 20.0 $g/m^2$, and more preferably 0.01 to 5 $g/m^2$. When the impregnation amount is within the above range, the supportability of the functional agent by the silicone fixed to the fibers can be improved.

When the treatment agent (B) is an emulsion obtained by dispersing the functional agent in water or an aqueous solution obtained by dissolving the functional agent in water, drying may be performed to vaporize the water. The drying may be performed, e.g., by blowing hot air on the fibers or using a heating furnace. The drying temperature and the drying time may be determined as desired so as not to affect the fibers. For example, the drying temperature may be 100 to 150° C. and the drying time may be 10 sec to 5 min.

In one embodiment of the present invention, for the sake of facilitating steps, the functional agent-containing fibers may be produced, e.g., by impregnating the fibers with a fiber treatment agent (C) containing the silicone and the functional agent, and irradiating the fibers impregnated with the fiber treatment agent (C) with an electron beam so that the silicone is fixed to the fibers and the functional agent is supported by the silicone fixed to the fibers. There is no particular limitation to the production of the functional agent-containing fibers.

The silicone component and the functional agent are dispersed in water to form an emulsion, and this emulsion may be used as the fiber treatment agent (C). Alternatively, the functional agent may be dissolved in water to form an aqueous solution. The silicone component may be dispersed in this aqueous solution to form an emulsion, and this emulsion may be used as the fiber treatment agent (C). In this case, a surfactant may be used. The surfactant may be the same as one of the above surfactants used to emulsify the silicone component. The concentration of the silicone component, i.e., the acrylic-modified organopolysiloxane (A) or the total concentration of the acrylic-modified organopolysiloxane (A) and the amino-modified organopolysiloxane (B) in the fiber treatment agent (C) may be 1 to 60% by mass, and more preferably 1 to 20% by mass. The concentration of the functional agent in the fiber treatment agent (C)

may be selected as appropriate in accordance with the kind of the functional agent, or the like.

Any known method such as roll coating, gravure coating, wire doctor coating, air knife coating, or dipping may be used to impregnate the fibers with the fiber treatment agent (C). There is no particular limitation to the method. The impregnation amount (also referred to as the coating amount) is preferably 0.01 to 20.0 g/m², and more preferably 0.01 to 5 g/m². When the impregnation amount is within the above range, the fixing properties of the silicone to the fibers can be improved.

In one embodiment of the present invention, the fibers impregnated with the fiber treatment agent (C) may be dried to vaporize the water. The drying may be performed, e.g., by blowing hot air on the fibers or using a heating furnace. The drying temperature and the drying time may be determined as desired so as not to affect the fibers. For example, the drying temperature may be 100 to 150° C. and the drying time may be 10 sec to 5 min.

The fibers impregnated with the fiber treatment agent (C) may be irradiated with an electron beam in the same manner and under the same condition as when the fibers impregnated with the fiber treatment agent (A) is irradiated with an electron beam. There is no particular limitation to the electron beam irradiation. The fibers may be washed with water after the electron beam irradiation, thereby removing unreacted silicone.

In one embodiment of the present invention, other agents for fibers such as an anticrease agent, a flame retardant, an antistatic agent, and a heat resistant agent may be added to the fiber treatment agents (A), (B), (C) as long as the properties of the fiber treatment agents are not impaired.

EXAMPLES

Next, embodiments of the present invention will be described in detail based on examples. However, the present invention is not limited to the following examples. In the following examples and comparative examples, the physical property values indicate measured values by the following test methods.

(Initial Total Content of Silicone and Functional Agent)

The mass (W0) of each starting material (a fabric) before the addition of silicone and a functional agent and the mass (W1) of each sample (a fabric) obtained by the addition of the silicone and the functional agent were measured. The initial total content (% by mass) of the silicone and the functional agent was calculated by the following formula.

$$\text{Initial total content of silicone and functional agent (\% by mass)} = (W1-W0)/W1 \times 100$$

When only the functional agent was added, the value as measured and calculated in the above manner was the initial content of the functional agent.

(Initial Amount of Si and Initial Content of Silicone)

Using an X-ray fluorescence analyzer ZSX100e manufactured by Rigaku Corporation, the mass of all elements (W0t) and the mass of Si atoms (W0s) contained in each sample before washing were measured by the EZ-scan method, and the initial amount of Si (% by mass) and the initial amount of the silicone (% by mass) were calculated by the following formulas. In the following formulas, MWs represents a molecular weight of the silicone with which the fabric was impregnated, and NSi represents the number of Si atoms per molecule in the silicone with which the fabric was impregnated.

$$\text{Initial amount of Si (\% by mass)} = [(W0s)/(W0t)] \times 100$$

$$\text{Initial content of silicone (\% by mass)} = [(W0s)/(W0t)] \times [MWs/(NSi \times 28)] \times 100$$

(Initial Content of Functional Agent)

The initial content of the functional agent was calculated by the following formula.

$$\text{Initial content of functional agent (\% by mass)} = (\text{initial total content of silicone and functional agent}) - (\text{initial content of silicone})$$

(Total Content of Silicone and Functional Agent after Washing 10 Times)

Samples each had the same mass as the samples used for the measurement of the initial total content of the silicone and the functional agent. The samples were washed 10 times in accordance with the JIS L 0217 103 method (detergent: JAFET) and dried. Then, the mass (W2) of each dried sample was measured. The total content (% by mass) of the silicone and the functional agent after washing 10 times was calculated by the following formula.

$$\text{Total content of silicone and functional agent after washing 10 times (\% by mass)} = (W2-W0)/W2 \times 100$$

When only the functional agent was added, the value as measured and calculated in the above manner was the content of the functional agent after washing 10 times.

(Amount of Si after Washing 10 Times and Content of Silicone after Washing 10 Times)

The samples were washed 10 times in accordance with the JIS L 0217 103 method (detergent: JAFET) and dried. Then, using the X-ray fluorescence analyzer ZSX100e manufactured by Rigaku Corporation, the mass of all elements (W10t) and the mass of Si atoms (W10s) contained in the individual samples after washing 10 times were measured by the EZ-scan method, and the amount of Si after washing 10 times and the content of the silicone after washing 10 times were calculated by the following formulas. In the following formulas, MWs represents a molecular weight of the silicone with which each fabric was impregnated, and NSi represents the number of Si atoms per molecule in the silicone with which each fabric was impregnated.

$$\text{Amount of Si after washing 10 times (\% by mass)} = (W10s)/(W10t) \times 100$$

$$\text{Content of silicone after washing 10 times (\% by mass)} = (W10s)/(W10t) \times [MWs/(NSi \times 28)] \times 100$$

(Content of Functional Agent after Washing 10 Times)

The content of the functional agent after washing 10 times was calculated by the following formula.

$$\text{Content of functional agent after washing 10 times (\% by mass)} = (\text{total content of silicone and functional agent after washing 10 times}) - (\text{content of silicone after washing 10 times})$$

(Rate of Decrease in Functional Agent after Washing 10 Times)

$$\text{Rate of decrease in functional agent after washing 10 times (\%)} = (W0f\% - W10f\%)/W0f\% \times 100$$

where W0f % represents the initial content of the functional agent, and W10f % represents the content of the functional agent after washing 10 times.

(Rate of Decrease in Si after Washing 10 Times)

Rate of decrease in Si after washing 10 times (%)=
(W0Si %×W10Si %)/W0Si %×100 where W0Si % represents the initial amount of Si, and W10Si % represents the amount of Si after washing 10 times.

(Rate of Decrease in Silicone after Washing 10 Times)

Rate of decrease in silicone after washing 10 times
(%)=(W0s%−W10s%)/W0s%×100 where W0s % represents the initial content of the silicone, and W10s % represents the content of the silicone after washing 10 times.

(Moisture Content)

An absolute dry mass, a standard mass (the mass of each sample after being left for two hours under standard conditions, i.e., at a temperature of 20° C. and a relative humidity of 65%), and a wet mass (the mass of each sample after being left for two hours under humid conditions, i.e., at a temperature of 30° C. and a relative humidity of 90%) of each sample (fabric) were measured. The moisture content was calculated by the following formulas.

Standard moisture content (%)=(standard mass−absolute dry mass)/absolute dry mass×100

Wet moisture content (%)=(wet mass−absolute dry mass)/absolute dry mass×100

Example 1

First, an acrylic-modified organopolysiloxane (A1) represented by the following average molecular formula (4) was mixed with an oleic acid and water to prepare a fiber treatment agent (C1) in which the concentration of the acrylic-modified organopolysiloxane (A1) was 10% by mass and the concentration of the oleic acid was 5.0% by mass. Next, a broadcloth made of 100% by mass of cotton (manufactured by KURABO) was immersed in the fiber treatment agent (C1), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/15/180L (manufactured by IWASAKI ELECTRIC CO., LTD.). The fibers (i.e., the broadcloth made of 100% by mass of cotton) thus treated with the electron beam were washed with water, squeezed by a mangle roller at a squeeze rate of 60%/0, and dried at 110° C. for 90 seconds. Thus, oleic acid-containing fibers were produced.

[Chemical Formula 4]

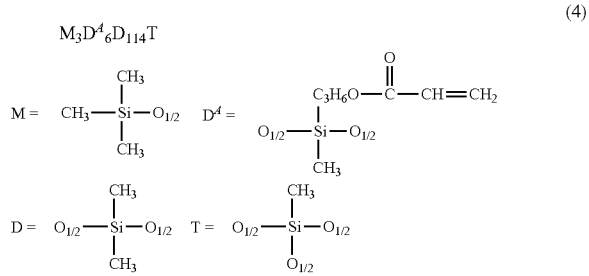

(4)

Example 2

The acrylic-modified organopolysiloxane (A1) represented by the above average molecular formula (4) was mixed with sericin (product name "Sericin-SS" manufactured by TANGO TEXTILE INDUSTRIAL ASSOCIATION) and water to prepare a fiber treatment agent (C2) in which the concentration of the acrylic-modified organopolysiloxane (A1) was 10% by mass and the concentration of the sericin was 0.8% by mass. Sericin-containing fibers were produced in the same manner as in Example 1 except that the fiber treatment agent (C2) was used instead of the fiber treatment agent (C1).

Example 3

The acrylic-modified organopolysiloxane (A1) represented by the above average molecular formula (4) was mixed with fucoidan (product name "Takara seaweed extract" manufactured by TAKARA BIO INC.) and water to prepare a fiber treatment agent (C3) in which the concentration of the acrylic-modified organopolysiloxane (A1) was 10% by mass and the concentration of the fucoidan was 1.5% by mass. Fucoidan-containing fibers were produced in the same manner as in Example 1 except that the fiber treatment agent (C3) was used instead of the fiber treatment agent (C1).

Example 4

The acrylic-modified organopolysiloxane (A1) represented by the above average molecular formula (4) was mixed with water to prepare a fiber treatment agent (A1) in which the concentration of the acrylic-modified organopolysiloxane (A1) was 10% by mass. A broadcloth made of 100% by mass of cotton (manufactured by KURABO) was immersed in the obtained fiber treatment agent (A1), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/30/90L (manufactured by IWASAKI ELECTRIC CO., LTD.). The fibers (i.e., the broadcloth made of 100% by mass of cotton) thus treated with the electron beam were washed with water, squeezed by a mangle roller at a squeeze rate of 60%, and dried at 110° C. for 90 seconds to produce fibers to which the silicone was fixed. Next, isosaponarin (product name "Wasabi-flavone" manufactured by KINJIRUSHI CO., LTD.) was mixed with water to prepare a fiber treatment agent (B1) in which the concentration of the isosaponarin was 2.0% by mass. The fibers (textile) to which the silicone was fixed were immersed in the fiber treatment agent (B1) and squeezed by a mangle roller at a squeeze rate of 60%. Further, the fibers were washed with water, squeezed by a mangle roller at a squeeze rate of 60%, and dried at 110° C. for 90 seconds. Thus, isosaponarin-containing fibers were produced.

Comparative Example 1

An oleic acid was mixed with water to prepare a fiber treatment agent (B2) in which the concentration of the oleic acid was 5.0% by mass. Next, a broadcloth made of 100% by mass of cotton (manufactured by KURABO) was immersed in the fiber treatment agent (B2), squeezed by a mangle roller at a squeeze rate of 60%, and dried at 110° C. for 90 seconds. Thus, oleic acid-containing fibers were produced.

Comparative Example 2

Sericin (product name "Sericin-SS" manufactured by TANGO TEXTILE INDUSTRIAL ASSOCIATION) was mixed with water to prepare a fiber treatment agent (B3) in which the concentration of the sericin was 0.8% by mass. Next, a broadcloth made of 100% by mass of cotton (manufactured by KURABO) was immersed in the fiber treatment agent (B3), squeezed by a mangle roller at a squeeze rate of 60%, and dried at 110° C. for 90 seconds. Thus, sericin-containing fibers were produced.

Comparative Example 3

Fucoidan (product name "Takara seaweed extract" manufactured by TAKARA BIO INC.) was mixed with water to prepare a fiber treatment agent (B4) in which the concentration of the fucoidan was 1.5% by mass. Next, a broadcloth made of 100% by mass of cotton (manufactured by KURABO) was immersed in the fiber treatment agent (B4), squeezed by a mangle roller at a squeeze rate of 60%, and dried at 110° C. for 90 seconds. Thus, fucoidan-containing fibers were produced.

Comparative Example 4

Isosaponarin (product name "Wasabi-flavone" manufactured by KINJIRUSHI CO., LTD.) was mixed with water to prepare a fiber treatment agent (B1) in which the concentration of the isosaponarin was 2.0% by mass in the same manner as in Example 4. Next, a broadcloth made of 100% by mass of cotton (manufactured by KURABO) was immersed in the fiber treatment agent (B1), squeezed by a mangle roller at a squeeze rate of 60%, and dried at 110° C. for 90 seconds. Thus, isosaponarin-containing fibers were produced.

Comparative Example 5

The acrylic-modified organopolysiloxane (A1) represented by the above average molecular formula (4) was mixed with glyceryl glucoside (product name "αGG-L" manufactured by TATSUUMA-HONKE BREWING CO. LTD) and water to prepare a fiber treatment agent (C5) in which the concentration of the acrylic-modified organopolysiloxane (A1) was 10% by mass and the concentration of the glyceryl glucoside was 35.0% by mass. Glyceryl gluco- side-containing fibers were produced in the same manner as in Example 1 except that the fiber treatment agent (C5) was used instead of the fiber treatment agent (C1).

Comparative Example 6

The fiber treatment agent (C2) in which the concentration of the acrylic-modified organopolysiloxane (A1) was 10% by mass and the concentration of the sericin was 0.8% by mass was prepared in the same manner as in Example 2. Next, a broadcloth made of 100% by mass of cotton (manufactured by KURABO) was immersed in the fiber treatment agent (C2) and squeezed by a mangle roller at a squeeze rate of 60%. The broadcloth was washed with water, squeezed by a mangle roller at a squeeze rate of 60%, and dried at 110° C. for 90 seconds. Thus, sericin-containing fibers were produced.

Comparative Example 7

The fiber treatment agent (B3) in which the concentration of the sericin was 0.8% by mass was prepared in the same manner as in Comparative Example 2. Next, a broadcloth made of 100% by mass of cotton (manufactured by KURABO) was immersed in the fiber treatment agent (B3), squeezed by a mangle roller at a squeeze rate of 60%, and dried at 110° C. for 90 seconds to produce sericin-containing fibers. Then, the broadcloth was irradiated with an electron beam of 40 kGy at an acceleration voltage of 200 kV in a nitrogen atmosphere using an area beam type electron beam irradiation apparatus EC250/15/180L (manufactured by IWASAKI ELECTRIC CO., LTD.). The fibers (i.e., the broadcloth made of 100% by mass of cotton) thus treated with the electron beam were washed with water, squeezed by a mangle roller at a squeeze rate of 60%, and dried at 110° C. for 90 seconds. Thus, sericin-containing fibers were produced.

The initial content of the functional agent, the initial amount of Si, the initial content of the silicone, the content of the functional agent after washing 10 times, the amount of Si after washing 10 times, the content of the silicone after washing 10 times, the rate of decrease in the functional agent after washing 10 times, the rate of decrease in Si after washing 10 times, and the rate of decrease in the silicone after washing 10 times for the respective fibers (i.e., the broadcloths made of 100% cotton) obtained in the Examples and the Comparative Examples were measured and calculated in the above manner. Table 1 shows the results.

TABLE 1

| | Functional Agent | | | Content of functional agent (% by mass) | | Content of silicone (% by mass) | | Amount of Si (% by mass) | | Rate of decrease in functional agent (%) | Rate of decrease in silicone (%) | Rate of decrease in Si (%) |
|---|---|---|---|---|---|---|---|---|---|---|---|---|
| | Kind | Concentration (% by mass) | Molecular weight (g/mol) | Initial | After washing 10 times | Initial | After washing 10 times | Initial | After washing 10 times | | | |
| Ex. 1 | Oleic acid | 5.0 | 283 | 2.03 | 1.31 | 1.63 | 1.61 | 0.58 | 0.57 | 35.5 | 1.7 | 1.7 |
| Ex. 2 | Sericin | 0.8 | 40,000 to 60,000 | 0.85 | 0.88 | 3.55 | 3.15 | 1.26 | 1.12 | −3.2 | 11.1 | 11.1 |
| Ex. 3 | Fucoidan | 1.5 | 200,000 | 0.33 | 0.25 | 3.89 | 3.41 | 1.38 | 1.21 | 22.8 | 12.3 | 12.3 |
| Ex. 4 | Isosaponarin | 2.0 | 594 | 1.34 | 1.36 | 4.06 | 3.86 | 1.44 | 1.37 | −1.3 | 4.9 | 4.9 |
| Comp. Ex. 1 | Oleic acid | 5.0 | 283 | 2.44 | 0.40 | — | — | — | — | 83.7 | — | — |

TABLE 1-continued

| | Functional Agent | | Content of functional agent (% by mass) | | Content of silicone (% by mass) | | Amount of Si (% by mass) | | Rate of decrease in functional agent (%) | Rate of decrease in silicone (%) | Rate of decrease in Si (%) |
|---|---|---|---|---|---|---|---|---|---|---|---|
| | Kind | Concentration (% by mass) | Molecular weight (g/mol) | Initial | After washing 10 times | Initial | After washing 10 times | Initial | After washing 10 times | | | |
| Comp. Ex. 2 | Sericin | 0.8 | 40,000 to 60,000 | 0.50 | 0.10 | — | — | — | — | 79.9 | — | — |
| Comp. Ex. 3 | Fucoidan | 1.5 | 200,000 | 1.48 | 0.00 | — | — | — | — | 100.0 | — | — |
| Comp. Ex. 4 | Isosaponarin | 2.0 | 594 | 1.77 | 0.00 | — | — | — | — | 100.0 | — | — |
| Comp. Ex. 5 | Glyceryl glucoside | 35.0 | 254 | 6.80 | −0.42 | 3.83 | 3.52 | 1.36 | 1.25 | 106.2 | 8.1 | 8.1 |
| Comp. Ex. 6 | Sericin | 0.8 | 40,000 to 60,000 | 0.76 | 0.26 | 3.75 | 1.52 | 1.33 | 0.54 | 66.3 | 59.4 | 59.4 |
| Comp. Ex. 7 | Sericin | 0.8 | 40,000 to 60,000 | 0.48 | 0.05 | — | — | — | — | 89.5 | — | — |

The moisture content of each fabric obtained in Example 2 was measured in the above manner. Table 2 shows the results. The moisture content of each fabric obtained in Example 2 after washing 10 times was measured in the above manner. Table 2 also shows the results. As a reference example, the moisture content of each broadcloth made of 100% by mass of cotton (manufactured by KURABO) before and after washing were measured. Table 2 also shows the results.

TABLE 2

| | Moisture content before washing (%) | | Moisture content after washing 10 times (%) | |
|---|---|---|---|---|
| | standard | wet | standard | wet |
| Ex. 2 | 9.2 | 15.3 | 8.9 | 15.1 |
| Reference Ex. | 7.3 | 11.7 | 7.4 | 11.3 |

In Examples 1 to 3, the fibers had been impregnated with the fiber treatment agent (C) containing the acrylic-modified organopolysiloxane (A) and the functional agent, and then irradiated with the electron beam. In Example 4, the fibers had been impregnated with the fiber treatment agent (A) containing the acrylic-modified organopolysiloxane (A), irradiated with the electron beam, and then impregnated with the fiber treatment agent (B) containing the functional agent. Consequently, as understood from the data in Table 1, the washing resistance was improved and the removal of the silicone and the functional agent due to washing was suppressed because the silicone was fixed to the fibers and the functional agent was supported by the silicone fixed to the fibers in each of the Examples. The reason for this is as follows. Since the acrylic-modified organopolysiloxane (A) having two or more acrylic groups per molecule was used as the silicone, radicals were generated by electron beam irradiation and a crosslinking reaction of the silicone proceeds while the silicone is entangled with the fibers by, e.g., graft polymerization. Thus, the silicone was fixed to the fibers. Moreover, the functional agent was structurally entangled with the silicone fixed to the fibers, and thus is supported by the silicone. Alternatively, the functional agent interacted hydrophobically with the silicone fixed to the fibers, so that the functional agent was supported by the silicone.

In Example 2, the sericin as a moisturizing agent was supported by the silicone fixed to the fibers. Consequently, as understood from the data in Table 2, the fibers had a high moisture retention rate even after washing compared with the reference example that did not contain a functional agent.

In Comparative Examples 1 to 4, the functional agent had been added by impregnating the fibers with the fiber treatment agent containing the functional agent. At first, the functional agent had adhered to the fibers. However, the functional agent was mostly removed after washing. In Comparative Example 5, the fibers had been impregnated with the fiber treatment agent (C) containing the acrylic-modified organopolysiloxane (A) and the functional agent, and then irradiated with the electron beam. However, due to the use of glyceryl glucoside as the functional agent, the functional agent had adhered to the fibers at first, but was mostly removed after washing. In Comparative Example 6, the fibers had been impregnated with the fiber treatment agent (C) containing the acrylic-modified organopolysiloxane (A) and the functional agent, but had not been subjected to electron beam irradiation. At first, the functional agent had adhered to the fibers. However, the functional agent was mostly removed after washing. In Comparative Example 7, the fibers had been impregnated with the fiber treatment agent (B) containing only the functional agent without the acrylic-modified organopolysiloxane (A), and then irradiated with the electron beam. At first, the functional agent had adhered to the fibers. However, the functional agent was mostly removed after washing.

The invention claimed is:

1. Functional agent-containing fibers comprising a functional agent,
   wherein the functional agent is supported by silicone fixed to the fibers by structural entanglement or hydrophobic interaction,
   the silicone comprises an acrylic-modified organopolysiloxane having two or more acrylic groups per molecule,
   the acrylic-modified organopolysiloxane having two or more acrylic groups per molecule contains a unit represented by the following general formula (1) in the molecule:

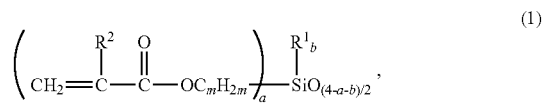

wherein R¹ represents a same or different unsubstituted monovalent hydrocarbon group having 1 to 18 carbon atoms, R² represents a hydrogen atom, m is an integer of 1 to 8, and a and b are positive numbers that satisfy a+b≤3, the acrylic-modified organopolysiloxane has a viscosity of 50 to 5000 mPa·s at 25° C., and a rate of decrease of the functional agent after the functional agent-containing fibers are washed 10 times is less than 40%.

2. The functional agent-containing fibers according to claim 1, wherein the functional agent is at least one selected from the group consisting of a fatty acid, a polyphenol, a protein, and a polysaccharide.

3. The functional agent-containing fibers according to claim 1, wherein the fibers comprise one or more natural fibers selected from the group consisting of cotton, silk, hemp, wool, angora, and mohair.

4. The functional agent-containing fibers according to claim 1, wherein the fibers are in at least one form selected from the group consisting of staple, filament, tow, yarn, woven fabric, knitted fabric, wadding, and nonwoven fabric.

5. The functional agent-containing fibers according to claim 1, wherein in the general formula (1), R¹ is a methyl group.

6. The functional agent-containing fibers according to claim 1, wherein the functional agent is at least one selected from the group consisting of fucoidan and isosaponarin.

7. The functional agent-containing fibers according to claim 1, wherein the functional agent is at least one selected from the group consisting of an oleic acid, sericin, fucoidan, and isosaponarin.

8. A method for producing functional agent-containing fibers comprising a functional agent,
the method comprising:
irradiating fibers impregnated with a fiber treatment agent (A) comprising silicone with an electron beam so as to fix the silicone to the fibers; and
impregnating the fibers to which the silicone has been fixed with a fiber treatment agent (B) comprising a functional agent,
wherein the silicone comprises an acrylic-modified organopolysiloxane having two or more acrylic groups per molecule,
the functional agent is supported by the silicone fixed to the fibers by structural entanglement or hydrophobic interaction,
the acrylic-modified organopolysiloxane having two or more acrylic groups per molecule contains a unit represented by the following general formula (1) in the molecule:

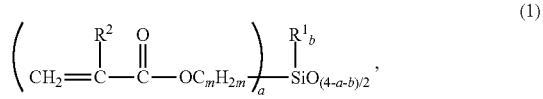

wherein R¹ represents a same or different unsubstituted monovalent hydrocarbon group having 1 to 18 carbon atoms, R² represents a hydrogen atom, m is an integer of 1 to 8, and a and b are positive numbers that satisfy a+b≤3, and the acrylic-modified organopolysiloxane has a viscosity of 50 to 5000 mPa·s at 25° C.

9. A method for producing functional agent-containing fibers comprising a functional agent,
the method comprising:
impregnating fibers with a fiber treatment agent (C) comprising silicone and a functional agent; and
irradiating the fibers impregnated with the fiber treatment agent (C) with an electron beam so as to fix the silicone to the fibers,
wherein the silicone comprises an acrylic-modified organopolysiloxane having two or more acrylic groups per molecule,
the functional agent is supported by the silicone fixed to the fibers by structural entanglement or hydrophobic interaction,
the acrylic-modified organopolysiloxane having two or more acrylic groups per molecule contains a unit represented by the following general formula (1) in the molecule:

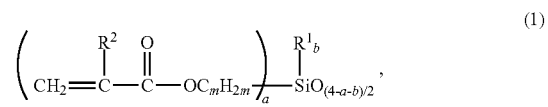

wherein R¹ represents a same or different unsubstituted monovalent hydrocarbon group having 1 to 18 carbon atoms, R² represents a hydrogen atom, m is an integer of 1 to 8, and a and b are positive numbers that satisfy a+b≤3, and the acrylic-modified organopolysiloxane has a viscosity of 50 to 5000 mPa·s at 25° C.

10. The method according to claim 9, wherein the functional agent is at least one selected from the group consisting of a fatty acid, a polyphenol, a protein, and polysaccharide.

11. The method according to claim 9, wherein the fibers comprise one or more natural fibers selected from the group consisting of cotton, silk, hemp, wool, angora, and mohair.

12. The method according to claim 9, wherein the fibers are in at least one form selected from the group consisting of staple, filament, tow, yarn, woven fabric, knitted fabric, wadding, and nonwoven fabric.

13. The method according to claim 8, wherein the functional agent is at least one selected from the group consisting of a fatty acid, a polyphenol, a protein, and polysaccharide.

14. The method according to claim 8, wherein the fibers comprise one or more natural fibers selected from the group consisting of cotton, silk, hemp, wool, angora, and mohair.

15. The method according to claim 8, wherein the fibers are in at least one form selected from the group consisting of staple, filament, tow, yarn, woven fabric, knitted fabric, wadding, and nonwoven fabric.

* * * * *